Figures 1, 2:
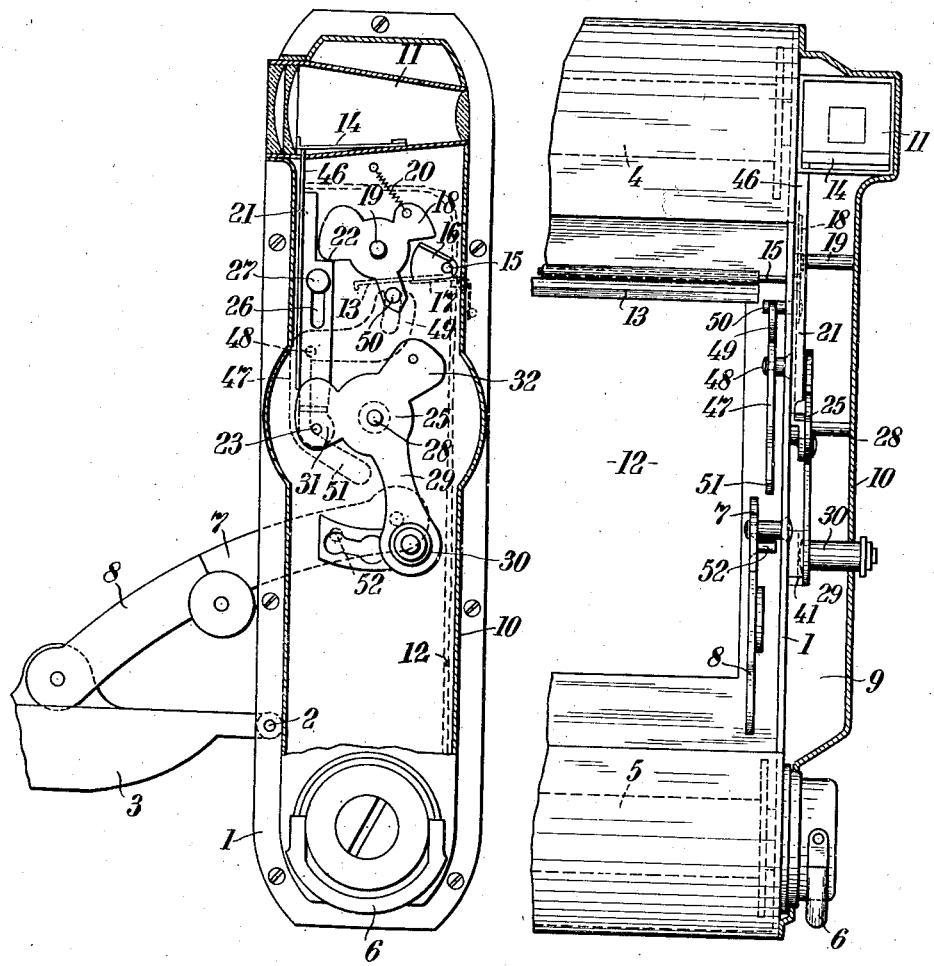

Feb. 25, 1941.  W. BAUMGÄRTNER  2,233,239
PHOTOGRAPHIC ROLL FILM CAMERA
Filed Jan. 14, 1939   3 Sheets-Sheet 1

Inventor
Wilhelm Baumgärtner
by Franz Reinhold
Attorney

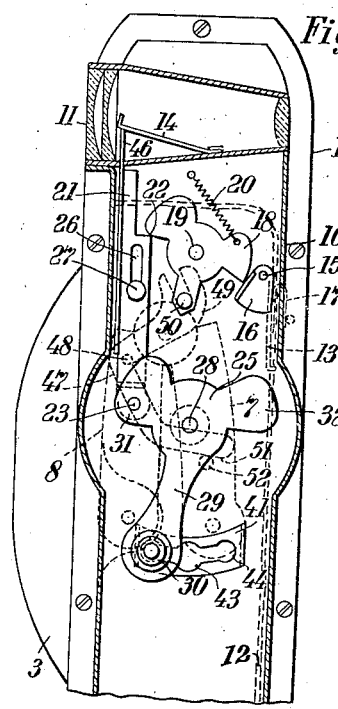
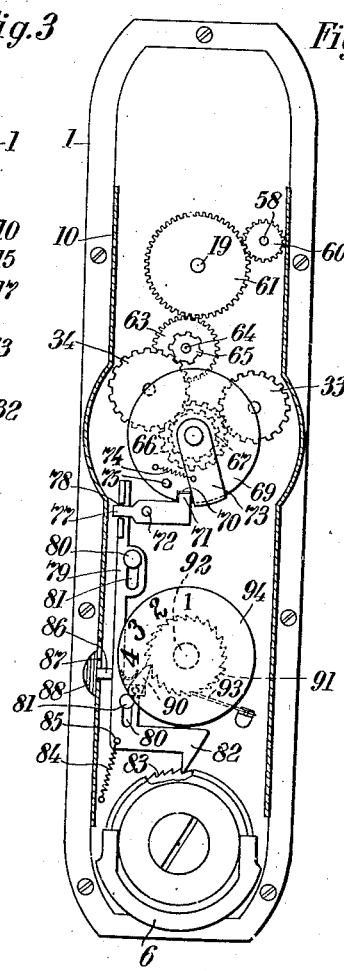
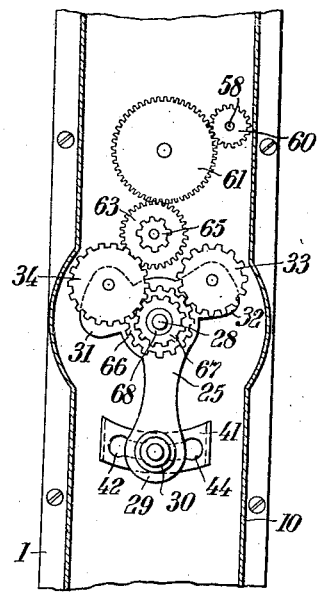
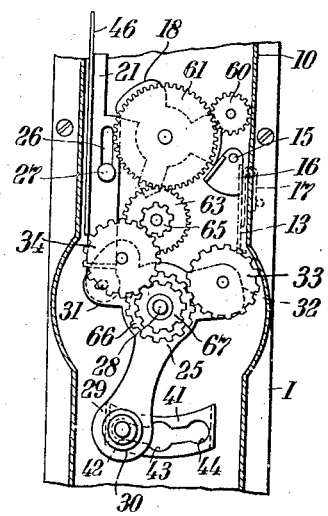
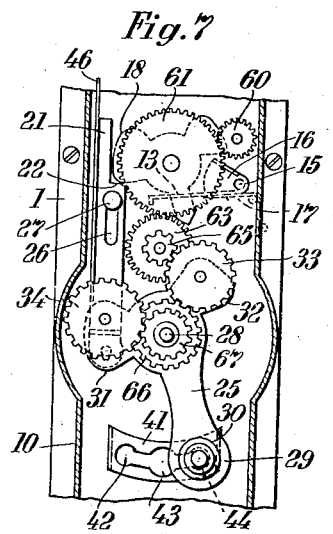

Feb. 25, 1941.　　W. BAUMGÄRTNER　　2,233,239
PHOTOGRAPHIC ROLL FILM CAMERA
Filed Jan. 14, 1939　　3 Sheets-Sheet 3

Inventor
Wilhelm Baumgärtner
by Franz Reinhard
Attorney

Patented Feb. 25, 1941

2,233,239

UNITED STATES PATENT OFFICE 2,233,239

PHOTOGRAPHIC ROLL FILM CAMERA

Wilhelm Baumgärtner, Brunswick, Germany, assignor, by mesne assignments, to Sherka Chemical Co. Inc., Bloomfield, N. J., a corporation Application January 14, 1939, Serial No. 250,873
In Germany January 15, 1938

10 Claims. (Cl. 95—32)

My invention relates to improvements in photographic roll film cameras, and more particularly in cameras of the type in which the size of the exposure aperture may be varied, and in which the film feeding means are operated in such a way that the images are produced on the sensitized film in immediate succession and without waste of a length of film. The object of the improvements is to provide a camera of this type in which the mechanism for varying the size of the exposure aperture and for feeding the film in accordance with the size of the said aperture are simple in construction. With this object in view my invention consists in providing a mask for reducing the size of the exposure aperture at one end only of the said exposure aperture, and more particularly at the end located near the film delivering spool, and constructing the film feeding mechanism so that one edge of each film section of full size or reduced size coincides with the end of the exposure opening which is located at the side of the film winding spool. While with this construction the small size film is not located symmetrically of the optical axis of the object lens, yet this is not objectionable particularly in case of small size films in which the difference of the lengths of the full size film and of the film of reduced length is not large.

For the purpose of explaining the invention an example embodying the same has been illustrated in the accompanying drawings, in which the same reference characters have been used in all the views that indicate corresponding parts.

In said drawings—

Fig. 1 is an end elevation of the camera with the casing enclosing the mechanism for setting the shutter and the film winding mechanism shown in section and the mechanism controlling the film winding mechanism omitted for more clearly showing the mechanism for setting the shutter, the said setting mechanism being shown in the position in which the shutter partly covers the exposure aperture, Fig. 2 is an elevation viewed from the left in Fig. 1, the said casing being shown in section, Fig. 3 is a fragmentary end elevation similar to the one illustrated in Fig. 1 and showing the said setting mechanism in the position in which the shutter is retracted from the exposure aperture, Fig. 4 is an elevation similar to the one illustrated in Fig. 1 and showing the mechanism controlling the film feeding operation, the said setting mechanism being omitted, Fig. 5 is a fragmentary elevation similar to the one illustrated in Fig. 4 and showing the said controlling mechanism and its operating member in an intermediate position in which the said controlling mechanism is inoperative, Fig. 6 is an elevation similar to the one illustrated in Fig. 5 and showing the controlling mechanism and its operating member in the position for feeding small size lengths of film.

Figure 8:
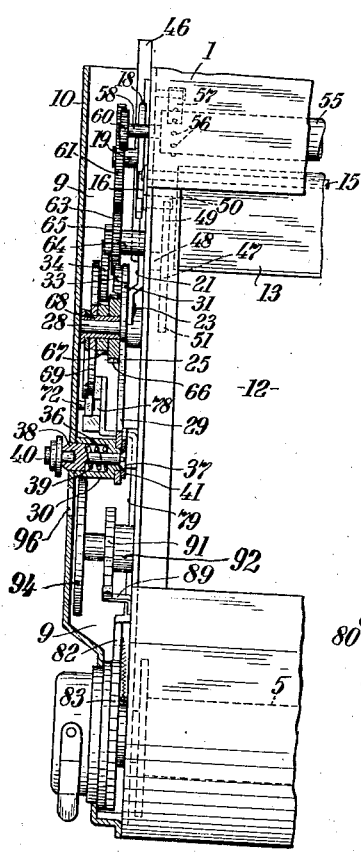
Figure 9:
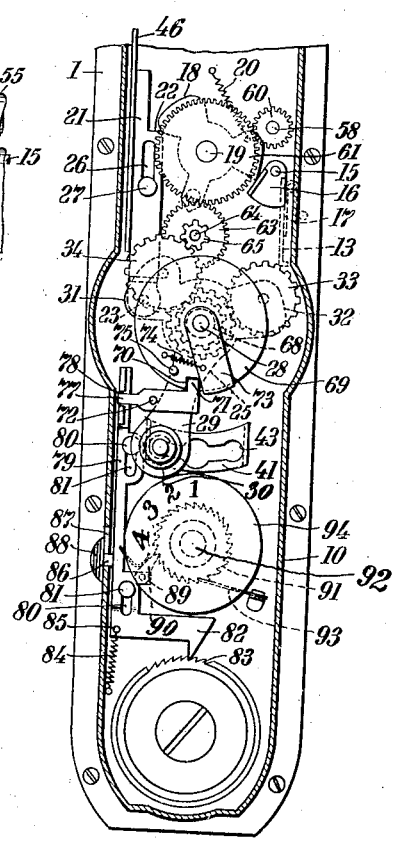

Fig. 7 is a similar elevation showing the said mechanism in the position for feeding large size films, Fig. 8 is an elevation similar to the one illustrated in Fig. 2 with the said casing and certain parts of the mechanism shown in section and viewed from the right in Fig. 9 and showing both the setting and the controlling mechanisms, and Fig. 9 is an elevation similar to the one illustrated in Fig. 1 and showing both the setting and the controlling mechanism.

In the figures I have shown a camera in which the full size images produced on the film have a dimension of 6×6 centimeters and the films of reduced size a dimension of 4½ by 6 centimeters.

In the example shown in the figures the camera comprises a body 1 having a base board 3 hinged thereto at 2, the said base board being adapted to be held in extended position by means of folding links 7, 8.

In the figures, 4 is the film delivering spool, 5 the film winding spool, and 6 the key for winding the film on the spool 5.

At one end of the body 1 a chamber 9 is provided the wall 10 of which is secured to the body 1. The upper part of the said chamber is enlarged and it accommodates a view finder 11. Within the said chamber the mechanism for reducing the size of the exposure aperture 12 and the mechanism controlling the film feeding movement are located.

For reducing the size of the exposure aperture a single movable mask 13 is provided at the upper end of the said exposure aperture and near the film delivering spool 4, and within the said finder 11 a movable mask 14 is provided which is adapted to be set in position corresponding to the position of the mask 13, so that the image viewed through the finder exactly corresponds to the size of the exposure aperture 12 and the image projected on the film.

The mask 13 is caried by a shaft 15 mounted in the end walls of the body 1 and passed into the chamber 9. Within the said chamber the shaft 15 has a cam 16 secured thereto, which is acted upon by a spring 17 tending to elevate the same into the position shown in Fig. 1 in which the mask is removed away from the exposure aperture 12. The said cam 16 is adapted to be engaged by a cam disk 18 pivotally mounted on the end wall of the body 1 at 19, a spring 20 tending to retract the cam disk away from the cam 16. One arm of the said cam disk 18 bears on a shoulder 22 of a slide rod 21 jointed at 23 to an arm 31 of a three-armed lever 25 and guided with a slot 26 on a pin 27 fixed to the end wall of the body 1. The lever 25 is pivotally mounted on the said end wall at 28. The downwardly directed arm 29 of the said lever carries a stud 30 adapted to be engaged by the hand of the attendant for setting the lever 25 into any one of three positions. On the arms 32 and 31 gear wheels 33 and 34 are rotatably mounted which are in mesh with gear wheels 66 and 67 rotatably mounted on the pivot bolt 28. The function of these gear wheels will be described hereafter.

The construction of the stud 30 is illustrated in Figs. 7 and 8. As shown, the said stud is tubular in shape, and it has a pin 36 slidable therein which is formed at its inner end with a conical head 37 and at its outer end with a flange 38 acted upon by a spring 39 and a button 40 adapted to be engaged by the hand of the attendant. The head 37 is guided in an arcuate slot made in a rail 41 fixed to and spaced from the end wall of the body 1, the said slot having three enlarged portions 42, 43 and 44 adapted to be engaged by the head 37 for fixing the lever 25 in position.

The slide rod 21 is made integral with a rod 46 extending into the finder chamber and engaging the mask 14. Internally of the body 1 a two-armed lever 47 is pivotally mounted on the end wall at 48 the upwardly directed bifurcated arm 49 of which engages a pin 50 fixed to the cam disk 18, and the downwardly directed arm 51 of the said lever is inclined downwardly and to the right in Fig. 1, and it is adapted to be engaged by a pin 52 fixed to the link 7.

By means of the mechanism so far described the masks 13 and 14 are operated as follows:

In the position of the parts shown in Fig. 1 the base board 3 is extended and the lever 25 has been turned anticlockwise and with its stud 30 into engagement with the portion 44 of the slot of the rail 41 (of Fig. 3). The slide rod 21 is in its lowermost position, the cam disk 18 has been retracted from the cam 16, and the mask 13 is in its uppermost position, so that the full size of the exposure aperture 12 is exposed to the rays impinging thereon. When the lever 25 is turned clockwise and with the stud 30 into engagement with the portion 42 of the slotted rail 41 (of Fig. 6), the slide rod 21 is shifted upwardly, and the cam disk 18 turns the mask 13 downwardly and into position for covering the top part of the exposure aperture, as has been shown in Fig. 3. Further, the rod 46 lifts the mask 14 into position for partly covering the object lens of the finder.

When the base board 3 (Fig. 1) is closed the link 7, 8 is folded upwardly, and the pin 52 engages the downwardly directed portion of the lever 47. Thereby the cam disk 18 is turned clockwise irrespectively of the position of the slide rod 21, for turning the mask 13 downwardly. If the base board 3 is again opened, the pin 52 releases the lever 47 whereupon the cam disk 18 is exclusively controlled by the lever 25.

The means for controlling film feed in co-ordination with mask position are shown in Figs. 4 to 9.

Above the exposure aperture, and at the side of the film delivering spool 4, a film guiding roller 55 (Fig. 8) is provided, the shaft 58 of which is rotatably mounted in the end walls of the body 1, and which is constructed so that it is carried along by the film being wound on the spool 5. As shown the roller is provided at one or both ends with a series of circumferentially arranged short needles 56 cooperating with leaf springs 57 pressing the film into engagement with the said needles.

To the end of the shaft 58 extending into the chamber 9 a gear wheel 60 is secured which is in mesh with a gear wheel 61 rotatably mounted on the pivot bolt 19 secured to the end wall of the body 1, and the gear wheel 61 is in mesh with a gear wheel 63 rotatably mounted on a pivot bolt 64. To the gear wheel 63 a coaxial pinion 65 is secured which has comparatively broad teeth. The gear wheels 33 and 34 mounted on the arms 31 and 32 of the lever 25 are adapted to be thrown by the swinging of the lever 25 alternately into engagement with the pinion 65, and they mesh respectively with the gear wheels 66 and 67 rotatably mounted on the pivot bolt 28 on which the arm 25 is mounted. The said gear wheels 33, 34 and 66, 67 respectively have different numbers of teeth, and the gear ratios of the gear wheels 34, 67 and 33, 66 correspond to the different lengths of film to be fed for full size and small size exposures. The gear wheels 66 and 67 are both fixed to a hub 68 rotatably mounted on the said pivot bolt 28 and to the said hub a disk 69 is secured which is formed with a notch 70. The said notch is adapted to be engaged by a pawl 71 pivotally mounted on the end wall of the body 1 at 72. The gear ratios of the gear wheels 33, 66 and 34, 67 are such that whenever a full size or small size length of film is fed the disk 69 makes a complete rotation. On the pivot bolt 28 a plate 73 is loosely mounted which slightly projects beyond the circumference of the disk 69 and is adapted to cover the notch 70. A spring 74 normally holds the said plate in engagement with a pin 75 and in position for covering the said notch.

The pawl 71 is formed with a heel 77 engaging in a slot 78 made at the upper end of a slide 79 guided by means of pins 80 and slots 81 on the side wall of the body 1. At its bottom the said slide 79 is formed with a pawl 82 engaging in the teeth of a ratchet disk 83 secured to the shaft of the film winding spool 5. A spring 84 attached to the slide 79 at 85 tends to pull the said slide 79 downwardly and with its pawl 82 into engagement with the ratchet disk 83 for locking the same in position and preventing rotary movement of the film spool 5. To the slide 79 a pin 86 is fixed which projects outwardly through a slot 87 made in the side wall of the casing 9. By means of a button 88 fixed to the pin 86 the slide 79 may be retracted upwardly and out of locking engagement with the ratchet disk 83 for permitting rotary movement of the film winding spool 5, and when the slide 79 has thus been shifted upwardly the pawl 71 drops out of engagement with the notch 70.

On an arm 89 (Fig. 9) of the slide 79 a spring pressed pawl 90 is mounted which is in engagement with a ratchet disk 91 rotatably mounted in the end wall of the body 1 at 92 and engaged by a spring latch 93. To the ratchet disk 91 a disk 94 is secured which has the Figures 1, 2, 3, 4, etc., printed on its front face and in the wall 10 a peep hole 96 is made through which one of the said figures at a time may be read.

The operation of the mechanism controlling the film winding spool is as follows:

When it is desired to insert a film into the camera, the lever 25 is first set into the median position shown in Fig. 5 in which the pin 36 engages the portion 43 of the slotted rail 41 (of Fig. 6), and in which both gear wheels 33 and 34 are out of mesh with the pinion 65. If now a full spool 4 is placed into the camera and the backing paper of the film is passed over the roller 55 and fixed to the film winding spool 5, the rotary movement transmitted to the said roller 55 is transmitted only to the gear wheels 60, 61, 63 and 65, while the disk 69 is not rotated. It will be understood that the slide 79 has been pulled upwardly by means of the pin 86 and out of engagement with the ratchet disk 83 and that the pawl 71 bears on the plate 73, the said plate covering the notch 70 and holding the slide 79 in elevated position and with the pawl 82 out of locking engagement with the ratchet disk 83.

The film backing paper is wound on the spool 5 so far that the figure "1" corresponding to the first section of the film is visible through the usual peep hole in the camera body (not shown). Finally, the disk 94 is rotated by reciprocating the slide 79 until the "figure 1" appears in the peep hole for the figures carried by the said disk. Now the camera is ready for making an exposure.

If it is desired to make a full size exposure, the lever 25 is set into the position shown in Figs. 1 and 7, so that the mask 13 is retracted from the exposure aperture and the full size of the said exposure aperture is free for having the image projected on the film, and the gear wheels 33, 66 of small gear ratio are in operative positions. If now the exposure is made a full size image is projected on the first section of the film. Now the film winding key 6 is rotated for winding the exposure section of the film on the spool 5, and the movement of the film is transmitted through the roller 55 and the gear wheels 60, 61, 63, 65 to the gear wheels 33 and 66 and the disk 69. The said disk rotates clockwise, and the pawl 71 which before bore on the plate 73 gets on the circumference of the disk 69. Near the end of a complete rotation of the said disk the pawl 71 engages the plate 73 and arrests the same while the disk 69 continues its rotary movement until the notch 70 is cleared, whereupon the pawl 71 (under the tension of spring 84) immediately engages in the said notch thus arresting the aforesaid train of gear wheels. By the said movement of the pawl 71 the slide 79 is released, and it is pulled downwardly by the spring 84 and into locking engagement with the ratchet disk 83, so that further movement of the film winding spool 5 and the key 6 is impossible.

If it was desired at first to make a small size exposure the lever 25 is set into the position shown in Figs. 3 and 6, in which the mask 13 covers the upper part of the exposure aperture 12, and the gear wheel 34 is in mesh with the pinion 65. If now the exposure is made the image is projected on a small size section of the film. Thereafter the key 6 is operated as before for winding the exposed film on the spool 6. By reason of the larger gear ratio of the gear wheels 34, 67 the disk 69 completes a full rotation after the small size section of the film has been wound on the spool 6. Thus in both cases, whether a full size or a small size exposure has been made, the rear or upper edge of the exposed film section arrives at the bottom end of the exposure aperture.

Before making another exposure, whether a full size or a small size exposure, the slide 79 is shifted upwardly for retracting the pawl 71 from the notch 70 and for advancing the disk 94 one step for bringing the figure 2 into position at the rear of its peep hole 96.

Now the lever 25 is again set either into the position shown in Figs. 1 and 7 for making a full size exposure, or into the position shown in Figs. 3 and 6 for making a small size exposure, whereupon the operation is the same as has just been described.

I claim:

1. In a photographic roll film camera, comprising a body formed with an exposure aperture, an object lens, and film delivering and winding spools, the invention herein described which consists of a mask located at one of the ends of said exposure aperture, mechanism for setting said mask into and out of position for partly covering said exposure aperture, mechanism connected with said setting mechanism for controlling the film winding operation, said controlling mechanism comprising two trains of gear wheels of different gear ratios for selectively feeding different lengths of film corresponding to the operative sizes of the exposure aperture and feeding the same with one end of each film length substantially to the edge of the non-reduced exposure aperture, and an operating member common to said setting mechanism and said controlling mechanism and movable between alternate positions, in one of which the mask is swung to aperture-covering position and the gear train of a ratio for feeding shorter lengths of film is brought into operation, and in the other of which the mask is swung to aperture-uncovering position and the gear train of a ratio for feeding greater lengths of film is brought into operation.

2. A photographic roll film camera as claimed in claim 1, in which the said operating member carries rotatably one gear wheel of each of the two said trains, and in which said operating member is movable between three positions: in one of which one of the gear wheels that it carries is in operative connection in its train while the other is idle; in the second the second gear wheel is in operative connection in its train while the first is idle; and in the third position both of the gear wheels that it carries are idle.

3. A photographic roll film camera as claimed in claim 1, in which the said setting mechanism comprises a cam disk loosely engaging said mask and a member connected with said operating member and loosely engaging said cam disk.

4. A photographic roll film camera as claimed in claim 1, in which the said trains of gear wheels comprise two gear wheels mounted on said operating member and adapted to be selectively set into operative postions.

5. A photographic roll film camera as claimed in claim 1, in which the said controlling mechanism comprises a measuring disk connected with both trains of gear wheels, and pawl and ratchet mechanism connected with said film winding spool and controlled by said measuring disk.

6. A photographic roll film camera as claimed in claim 1, in which the said controlling mechanism comprises a film measuring disk formed at its circumference with a notch, pawl and ratchet mechanism connected with said film winding spool and a pawl controlling the pawl of said ratchet mechanism and engaged by said measuring disk and adapted when engaged in said notch to throw said pawl of the ratchet mechanism into locking position.

7. A photographic roll film camera as claimed in claim 1, in which the said controlling mechanism comprises a film measuring disk formed at its circumference with a notch, pawl and ratchet mechanism connected with said film winding spool, a pawl controlling the pawl of said ratchet mechanism and engaged by said measuring disk and adapted when engaged in said notch to throw said pawl of the ratchet mechanism into locking position, a spring pressed plate carried by said measuring disk in position for covering said notch adapted to prevent engagement of the second-named pawl in the notch while film is being fed and adapted in the course of rotation of the measuring disk to be pressed away from said notch by engagement with said second-named pawl, and hand-operated means for retracting said second-named pawl from said notch.

8. In a photographic roll film camera that comprises a body formed with an exposure aperture in which are contained film delivering and winding spools adapted to sustain a portion of a length of film extended in a plane within the body and across said exposure aperture, the invention herein described that consists of a mask pivotally mounted in the body at one end of the exposure aperture and movable under tension from a normal and inactive position transverse to the plane in which the film is extended to a screening position in parallelism with such plane, means for swinging such mask from its inactive to its active position and means connected with such swinging means for controlling the film-winding operation, said controlling means comprising a spring-driven locking member movable between active and inactive position and normally locking said film-winding spool against rotation, the said locking member being movable manually against spring tension from active to inactive position, a pawl engaging said locking member, and a latch for said pawl in the form of a disk upon whose periphery the said pawl bears and by such bearing retains said spring-backed locking member in inactive position, the disk being provided with a peripheral notch and carrying pivotally mounted upon it a spring-driven notch-covering shield, the said pawl in the course of disk rotation engaging the shield and moving it against spring tension from notch-covering position, whereupon, the pawl being free to enter the notch, the aforesaid locking means are released to move in response to spring tension to active position, and means for rotating said disks selectively at fast or slow rate in response to film advance.

9. In a photographic roll film camera that includes in its structure a body formed with an exposure aperture, a base board hinged to the body and adapted to swing between open and closed positions, and film delivering and winding spools arranged within the body and adapted to sustain a portion of a length of film extended in a plane within the camera body and across said exposure aperture, the invention herein described which consists of a mask pivotally mounted in the body at one end of the exposure aperture and movable under tension from a normal position of inaction transverse to the plane in which the film is extended to a screening position in parallelism with such plane, the mask being responsive to the closing movement of the base board and movable from its transverse to its parallel position by the swinging of the base board from open to closed position, additional means operative while the base board continues in open position for swinging the mask from its transverse position relative to the plane of the film to its parallel position, and means connected with the last-named swinging means for controlling the film-winding operation, said controlling means comprising a spring-driven locking member movable between active and inactive positions and normally locking said film-winding spool against rotation, a pawl engaging said locking member, and a latch for said pawl in the form of a disk upon whose periphery said pawl bears and by such bearing retains said spring-backed locking member in inactive position, the disk being provided with a peripheral notch and carrying pivotally mounted upon it a spring-driven notch-covering shield, the said pawl in the course of disk rotation engaging the shield and moving it against spring tension from notch-covering position, whereupon, the pawl being free to enter the notch, the aforesaid locking means are released to move in response to spring tension to active position, and means for rotating said disks selectively at fast or slow rate in response to advance of film.

10. In a photographic roll-film camera comprising a body formed with an exposure aperture, an object lens, and film delivering and winding spools, the invention herein described which consists of a mask located at one of the ends of said exposure aperture, mechanism for setting said mask into and out of position for partly covering said exposure aperture, mechanism connected with said setting mechanism for controlling the film-winding operation, said controlling mechanism comprising two trains of gear wheels of different gear ratios, for selectively feeding different lengths of film, corresponding to the operative sizes of the exposure aperture and feeding the same with one end of each film length substantially to the other end of the exposure aperture, and an operating member common to said setting mechanism and said controlling mechanism and movable between alternate positions, in one of which the mask is swung to aperture-covering position and the gear train of a ratio for feeding shorter lengths of film is brought into operation, and in the other of which the mask is swung to aperture-uncovering position and the gear train of a ratio for feeding greater lengths of film is brought into operation.

WILHELM BAUMGÄRTNER.